United States Patent [19]

Prew et al.

[11] Patent Number: 5,257,740
[45] Date of Patent: Nov. 2, 1993

[54] APPARATUS AND PROCESS FOR RECYCLING SCRAP FILM

[75] Inventors: Stanley R. Prew, Williamsport; Mark J. Seksinsky, Watsontown, both of Pa.

[73] Assignee: Andritz Sprout-Bauer, Inc., Muncy, Pa.

[21] Appl. No.: 953,660

[22] Filed: Sep. 29, 1992

[51] Int. Cl.$^5$ .................. B02C 19/12; B02C 23/36
[52] U.S. Cl. ........................ 241/21; 241/24; 241/29; 241/79.1; 241/DIG. 38
[58] Field of Search ............ 241/21, 24, 79.1, 29, 241/78, DIG. 38

[56] References Cited

U.S. PATENT DOCUMENTS

| | | | |
|---|---|---|---|
| 3,680,796 | 8/1972 | Galeano | 241/21 |
| 4,314,674 | 2/1982 | Cerroni | 241/14 |
| 4,830,188 | 5/1989 | Hannigan et al. | 209/3 |
| 5,084,135 | 1/1992 | Brooks et al. | 162/4 |
| 5,104,047 | 4/1992 | Simmons | 241/20 |
| 5,148,993 | 9/1992 | Kashiwagi | 241/24 |
| 5,183,212 | 2/1993 | Boo et al. | 241/17 |
| 5,193,753 | 3/1993 | Menges | 241/43 |

FOREIGN PATENT DOCUMENTS 3535633  4/1987  Fed. Rep. of Germany ... 241/DIG. 38

Primary Examiner—Mark Rosenbaum
Assistant Examiner—John M. Husar
Attorney, Agent, or Firm—Chilton, Alix & Van Kirk

[57] ABSTRACT

An apparatus and process for recycling scrap film. The apparatus includes a washer-shredder upstream from a film cutter in order to remove impurities from the film. The scrap film is rinsed in a rinse loop which uses screen sieves for removing additional impurities, particularly paper fiber. The apparatus and method substantially reduce conventional problems with the film cutter caused by impurities which customarily are present in unwashed film. The invention is particularly useful for recycling very thin scrap film.

34 Claims, 2 Drawing Sheets

APPARATUS AND PROCESS FOR RECYCLING SCRAP FILM

BACKGROUND OF THE INVENTION

The present invention relates to recycling of scrap film, and more particularly relates to an improved apparatus and process for recycling scrap film.

It is desirable to recycle used plastic products, including consumer goods such as grocery bags, laundry bags, plastic food wrap, and industrial materials such as stretch wrap, agricultural film, and composite substances, in order to reduce quantities of waste disposal and reduce the need for production of new plastic. In a conventional plastic recycling process, strips of plastic scrap are fed to a dry cutter or size reduction device, and are subsequently transferred to a separate wet wash device. Customarily, the cutter is of the granulator type, and particulate contaminants are removed only later, i.e. during the washing step, using hydraclones or sink-float tanks. The use of a cutter in a conventional apparatus for processing plastic scrap material can be problematic, as the cutter is very sensitive to contaminants such as dirt and metals. This makes cutting of thin film particularly troublesome. Furthermore, hydraclones and sink-float tanks generally do not remove sufficient amounts of paper fiber from the scrap film during the washing step.

SUMMARY OF THE INVENTION

It is an object of the invention to provide a new and improved apparatus and process for recycling contaminated scrap film.

Another object of the invention is to provide an apparatus and process for recycling thin film.

A further object of the invention is to improve the operation of a film cutter which is used in the recycling of scrap film.

Yet another object of the invention is to provide an apparatus and method for efficiently recycling scrap film.

Other objects of the invention will be in part obvious and in part pointed out more in detail hereinafter.

The invention in a preferred form is an apparatus for recycling scrap film. The apparatus includes wetting means for wetting the scrap film with a liquid. The wetting means is connected to washing and shredding means for washing and shredding the scrap film. The film from the washing and shredding means is transferred to first separation means for separating the washed and shredded scrap film from particulate impurities including at least one of dirt, metal, wood, glass, heavy plastic and heavy paper. The first separation means is connected to cutting means in which the film is cut. The cutting means is in turn connected to rinsing means in which the cut film is rinsed.

Preferably, the apparatus further includes first deliquifying means between the cutting means and rinsing means for removing liquid from the cut scrap film, in order to separate the wash liquid from the rinse liquid.

The rinsing means preferably includes multistage rinsing means in which the scrap film is repeatedly rinsed and deliquified to form a purified scrap film product stream and a plurality of rinse liquid streams. The multistage rinsing means preferably comprises screen sieve means, which includes means for separating paper fiber from the scrap film. The multistage rinsing means preferably is connected to second separation means selected from the group consisting of centrifuge means and pressure fed sieve means for clarifying the liquid in the rinse liquid streams.

Preferably, the apparatus of the invention further includes particulate removal means positioned upstream from the shredding and washing means. The particulate removal means removes impurities, including dirt, metal, glass, heavy plastic, heavy paper and other high-density particulate materials from the scrap film. The apparatus also preferably includes multistage centrifuge means between the cutting means and the multistage rinsing means in order to remove PVC and vinyl plastic impurities.

Another preferred embodiment of the invention is a process for recycling scrap film. The process comprises wetting the scrap film with an appropriate liquid. The wet scrap film is subsequently washed and shredded. Particulate impurities including at least one of dirt, metal, wood, glass, heavy plastic, and heavy paper are removed from the washed and shredded scrap film. Subsequently, the scrap film is cut, and is then rinsed.

According to a preferred process of the invention, after cutting and before rinsing, the cut film is at least partially deliquified in order to separate the wash liquid from the rinse liquid. Preferably, rinsing is a multistage process which results in the formation of a scrap film product stream and a plurality of rinse liquid streams. Paper fiber and other materials are removed in the rinsing process. The liquid in the plurality of rinse liquid streams is clarified, and is then recycled for use in the rinsing step.

The process of the invention preferably includes the step of feeding the film to multistage centrifuge means for removal of PVC and vinyl plastic impurities before it is rinsed in the static dewatering means. The invention also preferably includes the step of removing particulate impurities including at least one of dirt, metal, glass, heavy plastics, and heavy paper from the scrap film before the washing and shredding step.

The apparatus and process of the invention are particularly useful for removing impurities from very thin scrap film including film having a thickness of about ¼ mil or less, as thin films of this type can be problematic when processed in a conventional manner. Preferably, the washing and rinsing liquid is water.

The invention accordingly comprises the several steps and the relation of one or more such steps with respect to each of the others, and the apparatus possessing the features, properties and the relation of elements exemplified in the following detailed disclosure.

BRIEF DESCRIPTION OF THE DRAWING

The FIG. 1A shows the wash loop for an apparatus and process for recycling contaminated scrap film according to a preferred embodiment of the invention.

DESCRIPTION OF THE PREFERRED EMBODIMENT

Figure 1A:
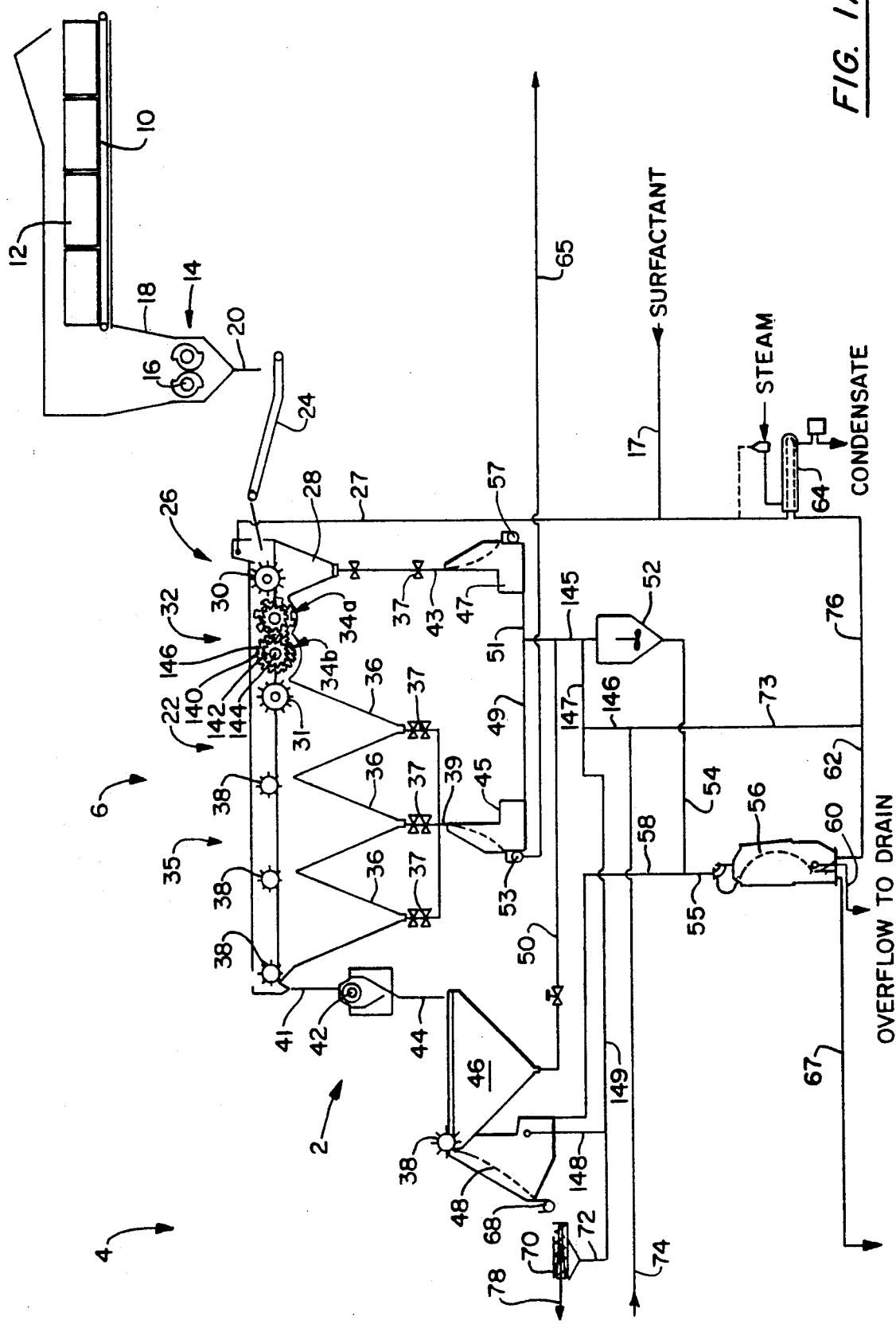
FIG. 1B shows the rinse loop for an apparatus and process for recycling contaminated scrap film according to a preferred embodiment of the invention.
Figure 1B:
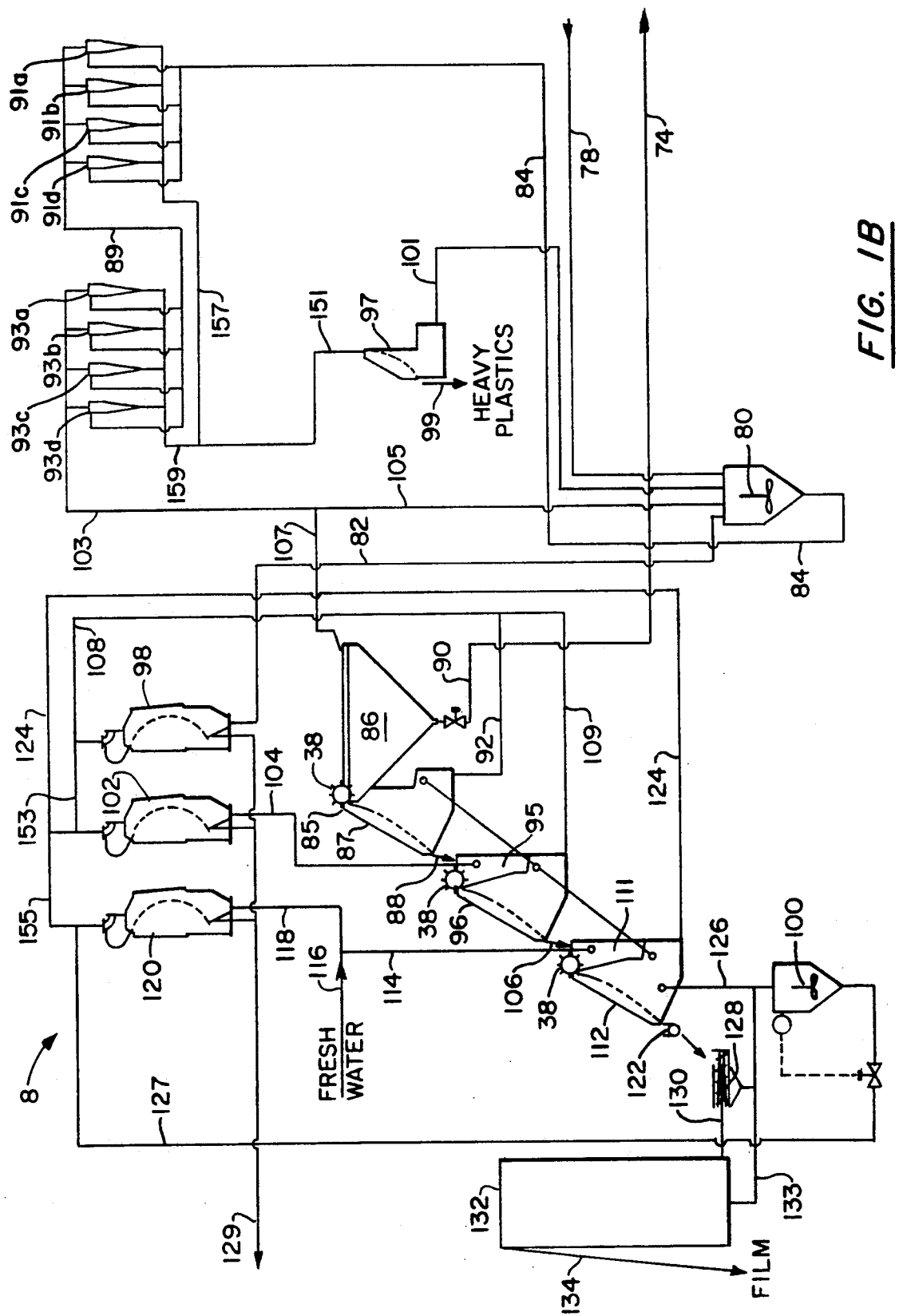

Referring to FIGS. 1A and 1B, an apparatus for recycling scrap film, particularly contaminated scrap film, is generally designated by the numeral 4. The apparatus includes two primary liquid flow loops, namely a wash loop 6, shown in FIG. 1A, and a rinse loop 8, shown in FIG. 1B, situated upstream and downstream, respectively, relative to a film cutting zone 2, shown in FIG. 1A. The scrap film is wet, shredded and washed, cut, and partially deliquified in the wash loop 6. The partially deliquified, cut film is subjected to multistage rinsing in the rinse loop 8.

Referring to the FIG. 1A in further detail, a bale conveyor 10 accepts bales 12 containing contaminated plastic film, and transfers them to a preliminary bale shredder 14. The conveyor 10, which can be of any suitable configuration, preferably can contain up to four bales, which can be loaded before the shredder 14 is started. The conveyor 10 can be reloaded either when it is empty or after a single bale has been consumed. The wires (not shown) which hold the bales together are removed manually.

The bale conveyor 10 transfers each bale individually to the bale shredder 14. The shredder 14 can be of a conventional type which includes two cylindrical, toothed, rotors 16 which are driven in opposite directions by a hydraulic motor. The drive system for the rotors has load sensors which can reverse the direction of the rotors when the load exceeds preset limits. Pieces of tramp metal which are too large to be shredded are manually removed through access panels in a feed hopper 18, which houses the shredder 14. The load sensors will stop the bale conveyor at a preset point in order to prevent the feed hopper from becoming overly filled.

The bales are shredded into strips which preferably are about 1-2 inches wide by about 6-12 inches long. Depending upon the nature of the bale feedstock, the strips can be in single layers, or can be in layers of about 1-3 inches thick.

The shredded scrap film drops from the bale shredder 14 via line 20 onto a conveyor 24, which transfers the film to a washer-shredder 22. The conveyor 24 includes a horizontal section which enables junk pieces to be removed from the shredded scrap film if necessary.

The washer-shredder is itself divided into three sections. The first section is a wetting-settling zone 26, including a diverging wetting-settling tank 28 in which hot water, preferably at a temperature of between about ambient temperature and 195° F., and more preferably about 180° F., and an appropriate quantity of a surfactant are added to the scrap material through a wash water-surfactant inlet line 27. The addition of surfactant into line 27 via line 17 is automatically controlled by a conductance probe (not shown). The surfactant in the soaking process in the wetting-settling zone 26 facilitates the removal of dirt and grease from the film. A paddle wheel-agitator 30 keeps the film in suspension.

The amounts of water, film and surfactant in the wetting-settling zone 26 can be any amounts which provide for cleaning of the film. Preferably, for every pound of scrap film, about 80 lbs of water ($\pm 30\%$) are used. For every 3 gals. water, about 1 oz. of surfactant is used. Sinking material, such as dirt, metal, wood, glass, heavy paper or cardboard, glass, etc., i.e. material having a higher specific gravity than the wetting liquid, is removed from the lower end of the tank 28 with water. Normally, the weight ratio of water to particulate material which is removed through the bottom of tank 28 is about one-to-one.

The wet film in the wetting-settling tank 28 is delivered by the paddles of agitator 30 to the second section of the washer-shredder, i.e. the washing-shredding zone 32. Unlike conventional processes, in which dry cutting occurs in a step which is separate from and before the washing step, the preferred washing-shredding zone of the invention provides for simultaneous washing and shredding of the scrap film. In zone 32, the film is pre-shredded prior to cutting, and is violently agitated to loosen dirt from the film surface.

The washing-shredding zone 32 includes a pair of interlocking, counter-rotating, toothed shredder rotors 34a and 34b which rotate at different speeds. The rotors preferably are designed and operated under conditions sufficient to shred the film into segments of about $\frac{1}{4}"\times 3"$ or smaller. Each rotor has a plurality of alternating large and small blades 140,142, respectively, which are mounted to a central shaft 144 at a spacing of about 0.03". Each blade is about 1¼ thick, and has a plurality of arched teeth 146. The larger diameter blades of one rotor run in close proximity (0.06") to the smaller diameter blades on the opposite rotor. As a result of this arrangement, there is both tip-to-tip interaction and side-to-side interaction between the teeth of the intermeshed blades. Preferably the speed ratio of the rotors is between about 1.5:1 and 15:1, the downstream rotor 34b having the faster rotation. Agitator 30 rotates clockwise in the view shown in FIG. 1A. Right rotor 34a rotates counterclockwise. Left rotor 34b rotates clockwise in the view shown in FIG. 1A. As a result of this arrangement, the film tends to generally move upward between agitator 30 and rotor 34a, and downward between rotors 34a and 34b. The liquid level is at about the center of the rotors.

The drive means for the shredder rotors 34a, 34b is interlocked with other parts of the apparatus in order to stop all the equipment upstream from the shredder in the event of an overload. Furthermore, the rotors 34a, 34b will reverse automatically in order to clear themselves in the event of an overload, and will subsequently return to normal operation.

A second agitator 31, which rotates in a clockwise direction in the view shown in FIG. 1A, follows the high-speed rotor 34b to provide a high shear zone for further separation of film and contaminates. The paddle wheel-agitator 31 also removes film from the washing-shredding zone 32 and transfers it to the third section of the washer-shredder 22, namely a settling zone 35.

The settling zone 35 includes three settling tanks 36. Between rotor 34b and agitator 31, the film is first moved upward by rotor 34b and then downward by agitator 31 into the first tank 36. In the settling tanks 36 the film is mildly agitated by the agitator 31 and paddles 38, which rotate clockwise in the view shown in FIG. 1A. A single paddle 38 is located between each pair of adjacent tanks 36, and a third paddle 38 is located at the downstream end of the downstream settling tank.

In the tanks 36, the film is provided with a retention time sufficient to further loosen dirt and grease and allow further contaminants to sink. Preferably, the retention time is at least about one minute, however, this time period can be varied within the scope of the invention as long as the period is sufficient to allow impurities to settle. The tanks 36 have subtle agitation to allow wood or paper fiber which has a specific gravity slightly lower than that of the liquid to sink. The impurities are removed from the washer-shredder 22 through the bottom of the settling tanks 36 and through the bottom of wetting-settling tank 28 through double dump valves 37. The valves 37 are sequenced to open one at a time, to give a relatively constant flow.

Liquid in lines 39 and 43 which has been separated from the particles that are removed in valves 37, is clarified in gravity fed screen sieves 45 and 47, respectively. The clarified liquid is transferred via lines 49 and 51, respectively, to line 145, through which it is fed to a mixing tank 52. Screw conveyors 53 and 57 convey the "overs" from sieves 45 and 47, respectively to a trash receptacle through line 65.

The shredded and washed film is transferred from one settling chamber to the next by paddles 38. The downstream paddle 38 conveys the film into a discharge line 41 through which it falls into a cutter 42.

The cutter 42 is described in detail in U.S. Pat. No. 4,738,404, the contents of which are incorporated herein by reference. The cutter 42, which can be of the same type as is used in conventional scrap film processing, cuts the washed film into $\frac{1}{8}''$ to $\frac{3}{8}''$ pieces to allow further separation of the dirt from the film. Furthermore, violent agitation is provided during the cutting action to loosen fine dirt particles from the film. The cut film is fed from the cutter 42 through line 44 to a diverging headbox-settling tank 46.

The film is transferred by a paddle 38 and by gravity from the headbox-settling tank 46 to an attached gravity fed screen sieve 48, in which the film is dewatered. The sieve 48 with an attached headbox preferably is a Hydrasieve gravity fed screen sieve available from Andritz Sprout-Bauer Inc., Muncy, Pa., which is described in Andritz Sprout-Bauer Bulletin G240, the contents of which are incorporated herein by reference. The gravity fed screen sieve 48 preferably has a wire spacing of 0.015'', however, the spacing can be any spacing which will enable impurities to be removed while retaining the film. The small particulate contaminates, such as paper fiber and heavy plastics, are removed at the bottom of tank 46 with liquid in line 50, and the liquid stream is subsequently conveyed through line 145 to mixing tank 52. The liquid which is collected in tank 52 is transferred through lines 54 and 55 to a pressure fed screen sieve 56, in which impurities including paper fiber are separated from the liquid.

Pressure fed screen sieve 56 preferably is a Micrasieve Pressure fed screen sieve available from Andritz Sprout-Bauer, Inc., Muncy, Pa., which is described in Andritz Sprout-Bauer Bulletin 440, the contents of which are incorporated herein by reference. Sieve 56 preferably, although not necessarily, has a mesh of about 100–150, and a feed pressure on the order of about 40 p.s.i. Effluent from the gravity fed screen sieve 48 in line 58 is also pumped through the pressure fed screen sieve 56.

A portion of the liquid is removed from the pressure fed screen sieve 56 and from the system through an overflow line 60 to minimize dirt build-up in the wash loop, while the remainder of the effluent from the pressure fed screen sieve is removed in line 62. The effluent in line 62 subsequently is transferred to line 76, heated in a heat exchanger 64 and then returned to the wetting-settling tank 28 via line 27 for use in wetting dry scrap film. Particulate material from the pressure fed screen sieve 56 is removed from the system through line 67.

The heat exchanger 64 provides temperature control of the wash loop liquid in a conventional manner. According to a particularly preferred embodiment of the invention, steam at 90 p.s.i and a rate of 3250 lbs/hr is used to heat 355 g.p.m. of water.

Overflow water from sieve 48 is removed in line 148, and is further transferred to line 149. A portion of the liquid in line 149 is transferred to line 147 for feeding to tank 52. Another portion of the liquid in line 149 bypasses tank 52 and pressure fed screen sieve 56, and is transferred to line 73, through which it is fed directly to line 76.

The dewatered scrap film is removed from gravity fed screen sieve 48 through a line defined by a screw conveyor 68, which in turn transfers the film to a dewatering press 70 in order to isolate the wash water from the rinse water. Additional water is removed from the film in the dewatering press 70. The removed water is transferred sequentially through line 72 to line 149. The dewatered film from press 70 is transferred by line 78 to a film mixing tank 80 in the rinse loop 8, shown in FIG. 1B, for dilution and agitation.

The film-liquid mixture in the mixing tank 80 is diluted with rinse water which is supplied through line 82. Tests have shown that the solids content of the rinse water preferably should be about 2 wt% or less in order for the gravity fed screen sieves in the rinse loop 8 to effectively remove paper fiber from the scrap film. The diluted scrap film stream is pumped through line 84 to a first set of four parallel hydroclones 91a, 91b, 91c, 91d. The hydroclones preferably are of the type which are disclosed in Andritz Sprout-Bauer Bulletin G33. The hydroclones 91a–d are arranged in parallel and are connected at their upper ends by line 89 to a second set of four hydroclones 93a, 93b, 93c, 93d, which also are arranged in parallel. The hydroclones remove heavy plastics, such as PVC and vinyl from the film. The heavy plastics are transferred from the bottoms of the hydroclones 91a–d through line 157 to line 151. The heavy plastics removed at the bottom of the hydroclones 93a–d through line 159 also are transferred to line 151. Line 151 subsequently transfers the hydroclone bottoms to a gravity fed sieve 97. The heavy particles are removed from sieve 97 in line 99. The liquid from the hydraclone bottoms is removed from sieve 97 in line 101 and is returned to mixing tank 80.

The film is removed at the upper end of parallel hydroclones 93a–d in line 103. Line 105 receives a portion of the film from line 103 and transfers it back to mixing tank 80. Line 107 receives most of the film from line 103 and transfers it to a headbox-settling tank 86, which is connected to a gravity fed screen sieve 87. The tank 86 has a drain line 90, which conveys make-up liquid through line 74 to line 73 in the wash loop. A paddle 38 transfers the scrap film stream from the tank 86 to the sieve 87, in which paper fiber is flushed from the film surface.

The combination of the headbox-settling tank 86 and gravity fed screen sieve 87 is substantially identical to the combination of the headbox settling tank 46 and gravity fed screen sieve 48 in the wash loop, including the same wire spacing of 0.015''. Gravity fed screen sieve 87 is one of three gravity fed screen sieves arranged in series. Sieve 87 has a single inlet 85, and two outlet lines, namely a film line 88, and an effluent line 92. The film line 88 transfers dewatered film to a headbox 95, which is integral with a gravity fed screen sieve 96. Effluent line 92 transfers effluent to line 108. Line 108 transfers a portion of the effluent to pressure fed screen sieve 98, and a portion to line 153, through which it is fed to pressure fed screen sieve 102. In sieves 98 and 102, the effluent is clarified due to the removal of particulate impurities such as paper fiber. Subsequently, the clarified effluent from sieve 98 is transferred to mixing tank 80 via line 82.

The film in headbox 95 is further rinsed using rinsing liquid which is supplied from a pressure fed sieve 102 through line 104. The slurry of film and rinsing liquid in headbox 95 is conveyed by a paddle 38 to gravity fed screen sieve 96, in which additional impurities, such as paper fiber, are flushed from the scrap film. Gravity fed screen sieve 96 has two outlet lines, including film line 106, and effluent line 109. Film line 106 transfers rinsed, deliquified film to a headbox 111, which is integral with a gravity fed screen sieve 112. Effluent line 109 conveys liquid to line 108, which transfers one portion of the rinse liquid to pressure fed screen sieve 98 and transfers another portion of the rinse liquid through line 153 to pressure fed screen sieve 102 for clarification.

The film in headbox 111 is rinsed a third time using rinse liquid supplied through line 114. Line 114 contains fresh liquid from line 116 and recycled liquid via line 118 from a pressure fed screen sieve 120. The volume ratio of liquid in line 114 according to the preferred embodiment of the invention is about 1 gpm fresh liquid for every 3 gpm of recycled liquid. The slurry of the film and rinsing liquid in tank 111 is conveyed by a paddle 38 to gravity fed screen sieve 112, in which further paper fiber is flushed from the scrap film. Gravity fed screen sieve 112 has three outlets, including a screw conveyor 122, effluent line 124 and overflow line 126. The screw conveyor 122 transfers the rinsed, deliquified film to a dewatering press 128. Effluent line 124 transfers a portion of the used rinse liquid to pressure fed screen sieve 102 for clarification, and a portion through line 124 to line 155, through which it is introduced into a pressure fed screen sieve 120. Overflow line 126 conveys overflow liquid to an overflow tank 100. The rinse liquid in overflow tank 100 is conveyed to pressure fed screen sieve 120 via line 127 for clarification. Particulate material removed in pressure fed screen sieves 98, 102 and 120 is conveyed to the edge of the system for removal through line 129.

Further dewatered film is removed from dewatering press 128 in line 130 and is transferred to a drying apparatus, schematically shown at 132, in which the liquid is removed from the film. The liquid is removed from the dryer 132 in line 133, and is recycled to mixing tank 100. The purified, dry scrap film product is removed from dryer 132 in film product line 134. The scrap film can then be used in conjunction with, or in place of new resin pellets in order to make new products.

The dryer 132 serves as a primary dewatering device. Furthermore, final bits of fiber are removed from the film due to the centrifugal action of the dryer.

The process equipment can be sized to meet the recycling demands of a particular facility. According to a preferred embodiment of the invention, an average of 2200 lbs/hr of scrap film are processed. A process of this volume preferably uses 40 gpm of fresh water via line 116 in the rinsing zone. Material balances for the scrap film and water for this embodiment are shown on Table 1 below. Purification processes at higher and lower rates also can take place.

The size and exact type of equipment which is used according to the preferred embodiment described above can be readily ascertained by one having ordinary skill in the art. Other equipment which performs a substantially equivalent function to the equipment described above also can be used.

As will be apparent to persons skilled in the art, various modifications and adaptations of the structure and method described above will become readily apparent without departure from the spirit and scope of the invention, the scope of which is defined in the appended claims.

TABLE 1

SCRAP FILM RECYCLING MATERIAL BALANCE

| Line | Water (gpm) | Scrap film (lbs/hr) |
|---|---|---|
| 20 | 0 | 2200 |
| 27 | 355 | — |
| 39 | 20 | — |
| 41 | 315 | 2200 |
| 43 | 20 | — |
| 44 | 315 | 2200 |
| 50 | 25 | — |
| 54 | 140 | — |
| 55 | 355 | — |
| 58 | 215 | — |
| 60 | 36 | — |
| 62 | 319 | — |
| 68 | 50 | 2200 |
| 72 | 46 | — |
| 73 | 36 | — |
| 74 | 40 | — |
| 76 | 355 | — |
| 78 | 4 | 2200 |
| 82 | 336 | — |
| 84 | 550 | 2200 |
| 88 | 50 | 2200 |
| 89 | 536.5 | 2200 |
| 90 | 40 | — |
| 92 | 250 | — |
| 103 | 523 | 2200 |
| 104 | 240 | — |
| 105 | 183 | — |
| 106 | 50 | 2200 |
| 107 | 340 | — |
| 108 | 490 | — |
| 109 | 240 | — |
| 114 | 240 | — |
| 116 | 40 | — |
| 118 | 200 | — |
| 122 | 50 | 2200 |
| 124 | 190 | — |
| 126 | 50 | — |
| 127 | 96 | — |
| 130 | 4 | 2200 |
| 133 | 46 | — |
| 134 | negl. | 2200 |
| 145 | 65 | — |
| 146 | 4 | — |
| 147 | 75 | — |
| 148 | 25 | — |
| 149 | 71 | — |
| 151 | 27 | — |
| 153 | 154 | — |
| 155 | 104 | — |

We claim:
1. An apparatus for recycling scrap film, comprising:
wetting means for wetting the scrap film with a liquid,
particulate removal means for removing particulate impurities from the wet scrap film by gravity,
washing and shredding means positioned downstream from the particulate removal means for washing and shredding the wet scrap film,
first separation means for separating the washed and shredded scrap film from particulate impurities including at least one of dirt, metal, wood, glass, heavy plastic and heavy paper,
cutting means for cutting the separated, washed and shredded scrap film, and
rinsing means for rinsing the cut scrap film, the rinsing means including multistage gravity fed screen sieve means for repeatedly rinsing and deliquifying the cut scrap film to obtain purified scrap film product and a plurality of rinse liquid streams, the wetting means, washing and shredding means, first separation means, cutting means, and rinsing means being fluidly connected to each other in series.

2. An apparatus according to claim 1, further comprising first deliquifying means between the cutting means and rinsing means for removing liquid from the cut scrap film.

3. An apparatus according to claim 1, wherein the rinsing means further comprises
second separation means for clarifying the liquid in the rinse liquid streams.

4. An apparatus according to claim 3, wherein the second separation means comprises a plurality of pressure fed screen sieves for separating paper fiber from the liquid.

5. An apparatus according to claim 1, wherein the multistage gravity fed screen sieve means includes means for separating paper fiber from the scrap film.

6. An apparatus according to claim 1, wherein the washing and shredding means comprises a washer-shredder having a pair of counter-rotating, intermeshed rotors.

7. An apparatus according to claim 6, wherein the washer-shredder simultaneously washes and shreds the scrap film.

8. An apparatus according to claim 6, wherein the rotors rotate at a speed differential of 1.5:1 to 15:1.

9. An apparatus according to claim 1, wherein the first separation means comprises at least one settling chamber.

10. An apparatus according to claim 1, wherein the wetting means, washing and shredding means, and first separation means are part of a single unit.

11. An apparatus according to claim 1, wherein the multistage gravity fed screen sieve means comprises first, second and third gravity fed screen sieves connected in series.

12. An apparatus according to claim 1, further comprising multistage centrifuge means between the cutting means and the rinsing means, for removing at least one of PVC and vinyl plastic impurities from the scrap film.

13. An apparatus according to claim 12, wherein the washing and shredding means simultaneously washes and shreds the scrap film.

14. An apparatus according to claim 1, wherein the second separation means is selected from the group consisting of pressure fed sieve means and centrifuge means fluidly connected to the multistage gravity fed screen sieve means.

15. A process for recycling scrap film, comprising:
(a) wetting the scrap film with a liquid,
(b) removing particulate impurities from the wet scrap film by gravity,
(c) washing and shredding the wet scrap film from step (b),
(d) removing particulate impurities including at least one of dirt, metal, wood, glass, heavy plastic, and heavy paper from the washed and shredded scrap film,
(e) cutting the scrap film after the removal of particulate impurities in step (d), and
(f) rinsing the cut scrap film in multistage gravity fed screen sieve means using a rinse liquid in order to remove additional impurities and form a scrap film product stream and a plurality of rinse liquid streams.

16. A process according to claim 15, further comprising the step of:
(g) clarifying the liquid in the plurality of rinse liquid streams and recycling the clarified rinse liquid streams to the rinsing means.

17. A process according to claim 16, further comprising the step of:
(h) at least partially deliquifying the cut scrap film prior to rinsing.

18. A process according to claim 15, wherein the scrap film is wetted and rinsed with water.

19. A process according to claim 15, wherein particulate impurities including at least one of dirt, metal, paper, glass, paper fiber, and wood are removed from the scrap film with the liquid in step (f).

20. A process according to claim 15, wherein washing and shredding occur simultaneously.

21. A process according to claim 15, wherein the rinsing step includes separating paper fiber from the scrap film.

22. A process according to claim 15, wherein the rinsing step includes feeding the scrap film to multistage centrifuge means before subjecting it to multistage rinsing.

23. A process according to claim 15, wherein step (f) comprises rinsing the cut scrap film in multistage gravity fed screen sieve means comprising a plurality of gravity fed screen sieves fluidly connected in series.

24. A process according to claim 15, wherein the clarifying step comprises clarifying the liquid in second separation means selected from the group consisting of pressure fed screen sieve means and centrifuge means.

25. An apparatus for recycling scrap film, including film having a thickness of about ¼ mil or less, comprising:
(a) wetting means for wetting the scrap film with a liquid,
(b) particulate removal means for removing particulate impurities from the wet scrap film by gravity,
(c) washing and shredding means for washing and shredding the wet scrap film from step (b),
(d) first separation means for separating the washed and shredded scrap film from particulate impurities including at least one of first, metal, wood, glass, heavy plastic and heavy paper,
(e) cutting means for cutting the separated, washed and shredded scrap film, and
(f) rinsing means for rinsing the cut scrap film, the rinsing means including
gravity fed screen sieve means for rinsing and deliquifying the cut scrap film to obtain purified scrap film product and a rinse liquid stream, and
second separation means fluidly connected to the gravity fed screen sieve means for clarifying the liquid in the rinse liquid stream,
the wetting means, washing and shredding means, first separation means, cutting means, and rinsing means being fluidly connected to each other in series.

26. An apparatus according to claim 25, further comprising
first deliquifying means between the cutting means and rinsing means for removing liquid from the cut scrap film.

27. An apparatus according to claim 25, wherein the gravity fed screen sieve means includes means for removing paper fiber from the scrap film.

28. An apparatus according to claim 25, wherein the second separation means comprises a plurality of pressure fed screen sieves for separating paper fiber from the liquid.

29. A process according to claim 25, wherein the second separation means is selected from the group consisting of pressure fed sieve means and centrifuge means fluidly connected to the gravity fed screen sieve means.

30. A process for recycling scrap film, including film having a thickness of about ¼ mil or less, comprising:
   (a) wetting the scrap film with a liquid,
   (b) removing particulate impurities from the wet scrap film,
   (c) washing and shredding the wet scrap film from step (b),
   (d) removing particulate impurities including at least one of dirt, metal, wood, glass, heavy plastic, and heavy paper from the washed and shredded scrap film,
   (e) cutting the scrap film after the removal of particulate impurities in step (d), and
   (f) rinsing the cut scrap film in gravity fed screen sieve means using clarified rinse liquid streams in order to form a scrap film product stream and a rinse liquid stream, and
   (g) clarifying the liquid in the rinse liquid stream and recycling the clarified rinse liquid stream to the gravity fed screen sieve means.

31. A process according to claim 30, further comprising the step of:
   (h) at least partially deliquifying the scrap film prior to rinsing.

32. A process according to claim 30, wherein the scrap film is wetted and rinsed with water.

33. A process according to claim 30, wherein step (f) comprises rinsing the cut scrap film in gravity fed screen sieve means comprising a plurality of gravity fed screen sieves fluidly connected in series.

34. A process according to claim 30, wherein the clarifying step comprises clarifying the liquid in second separation means selected from the group consisting of pressure fed screen sieve means and centrifuge means.

* * * * *

UNITED STATES PATENT AND TRADEMARK OFFICE
CERTIFICATE OF CORRECTION

PATENT NO. : 5,257,740
DATED : November 2, 1993
INVENTOR(S) : Stanley R. Prew et al It is certified that error appears in the above-indentified patent and that said Letters Patent is hereby corrected as shown below:

Claim 14, column 9, line 48, change "1" to —3—.

Claim 24, column 10, line 31, change "15" to —16—.

Signed and Sealed this

Twenty-first Day of March, 1995

Attest:

BRUCE LEHMAN

Attesting Officer      Commissioner of Patents and Trademarks